United States Patent [19]
Sasaki et al.

[11] Patent Number: 5,819,623
[45] Date of Patent: Oct. 13, 1998

[54] POSITIONING APPARATUS FOR USE IN A TABLE-TOP CIRCULAR SAW

[76] Inventors: Katsuhiko Sasaki; Toshiyuki Kani, both of c/o Makita Corporation 11-8 Sumiyoshi-cho 3-chome, Anjo-shi, Aichi-ken, Japan

[21] Appl. No.: 771,975

[22] Filed: Dec. 23, 1996

[30] Foreign Application Priority Data

Dec. 27, 1995 [JP] Japan ................................. 7-341248

[51] Int. Cl.⁶ .................................................... B26D 5/08
[52] U.S. Cl. .......................... 83/468.2; 83/468.3; 83/581
[58] Field of Search ................................. 83/581, 468.2, 83/468.3, 468.7

[56] References Cited

U.S. PATENT DOCUMENTS

| | | | |
|---|---|---|---|
| 1,771,434 | 7/1930 | Crawford | 83/468.2 |
| 4,283,977 | 8/1981 | Batson . | |
| 4,454,793 | 6/1984 | Strong | 83/581 |
| 4,608,900 | 9/1986 | Guiu et al. | 83/581 |
| 4,651,607 | 3/1987 | Camp | 83/468.2 |
| 4,875,399 | 10/1989 | Scott et al. | 83/581 |
| 5,050,473 | 9/1991 | Ingram et al. | 83/581 |
| 5,191,821 | 3/1993 | Metzger, Jr. et al. | 83/581 |
| 5,201,863 | 4/1993 | Peot | 83/581 |
| 5,239,905 | 8/1993 | Dunn . | |
| 5,347,902 | 9/1994 | Brickner et al. | 83/581 |
| 5,392,678 | 2/1995 | Sasaki . | |
| 5,483,858 | 1/1996 | Chen | 83/581 |

*Primary Examiner*—Maurina T. Rachuba
*Attorney, Agent, or Firm*—Lahive & Cockfield, LLP

[57] ABSTRACT

A pair of symmetrical positioning clamps are provided for use in a table-top circular saw. Each positioning clamp essentially comprises a support plate with an increasing width toward an abutment plate which is connected to the support plate at right angles. Also, an elongated slot is formed approximately along the center line of the support plate. Furthermore, the support plate is arranged obliquely relative to the abutment plate so that the center line of the elongated slot is at an angle of 60° to the abutment plate. The two positioning clamps are fixed to both wing portions of the circular saw by tightening wing bolts inserted into holes in the wing portions via the elongated slots. To clamp a work piece, the wing bolts are loosened with the work piece pressed against a fence of the circular saw. Then, the abutment plates are slid until they firmly abut on the work piece. Subsequently, the wing bolts are tightened again to secure the clamps with the support plates extended at an angle to the work piece.

13 Claims, 7 Drawing Sheets

PRIOR ART

POSITIONING APPARATUS FOR USE IN A TABLE-TOP CIRCULAR SAW

BACKGROUND OF THE INVENTION

1. Field of the Invention

The present invention relates to a table-top circular saw. More particularly the present invention relates to a positioning apparatus for use in a table-top circular saw.

2. Description of the Prior Art

With specific reference to FIGS. 6A and 6B, reference numeral 20 generally designates a known table-top circular saw comprising a base structure 21, a turntable 22 rotatably mounted on the base structure 21, an arm 23 mounted at the rear of the base structure 21, and a saw assembly 25 pivotally attached to the top end of the arm 23. The saw assembly 25 is provided with a motor-driven circular saw blade 24 rotatably attached thereto for cutting a work piece W. The base structure 21 is provided with a pair of generally T-shaped positioning clamps 28 each including an abutment plate 29 and a support plate 30 having an elongated slot 31 formed therein. Moreover, the turntable 22 has a fence 26 provided thereon at right angles to the saw blade 20.

When in operation, the saw assembly 25 is lowered and with the saw blade 24 cuts the work piece W while it is abutted against the fence 26. Besides orthogonal cutting, the circular saw blade 20 can perform angular cutting by tilting the saw assembly 25 and the arm 23 from the vertical position as best shown in FIG. 6B. The circular saw blade 20 can also perform diagonal cutting on the horizontal by turning the turntable 22 with a handle 27 at the front table skirt thereof.

To perform angular or diagonal cutting in a work piece such as a molding piece 33 as shown in FIG. 7A (installed as a facing member where a ceiling 34 meets a wall 35 as shown in FIG. 7B), the molding piece 33 is leaned against the fence 26 and secured with either one or both of the positioning clamps 28 while each wing bolt 32 is inserted through the slot 31 and tightened.

This known saw blade 20 has, however, failed to provide for the proper positioning and anchoring of the work piece W because the abutment plates 29 are located far from the saw blade path. If long abutment plates are employed, however, they may interfere with the saw blade 24 when it is tilted for angular cutting.

The positioning clamps 28 are further handicapped; since the slot 31 of the support plate 30 is extended orthogonally to the fence 26, the abutment plate 29 tends to be shifted along the elongated slot 31 by a reaction force, resulting in an inaccurate positioning of the molding piece.

Moreover, when the handle 27 is turned to either side in order to perform diagonal cutting, the support plate 30 may interfere, thus limiting the degree of freedom of cutting.

SUMMARY OF THE INVENTION

In view of the above-identified problems, it is an object of the present invention to provide a positioning apparatus for use in a table-top circular saw which enhances the cutting accuracy by securely positioning a work piece.

It is another object of the present invention to provide a positioning apparatus for use in a table-top circular saw which is free of undesirable shifting caused by a reaction force.

It is yet another object of the present invention to provide a positioning apparatus for use in a table-top circular saw which is not obstructive to angular and/or diagonal cutting.

It is still another object of the present invention to provide a positioning apparatus for use in a table-top circular saw which improves the operability of the table-top circular saw.

The above and other related objects are realized by providing a positioning apparatus for use in a table-top circular saw comprising: an abutment portion for abutting on a work piece placed on a table of the circular saw; a support portion extended from the abutment portion in the direction opposite to the work piece; a fastening means provided in the table for fastening the support portion on the table 1 and, the support portion extending obliquely relative to the work piece in the direction away from a blade slot when the work piece is positioned with the abutment portion abutting on the work piece. One or two of the positioning apparatuses may be mounted on one or both sides of the blade slot of the table-top circular saw.

Preferably, the support portion is a plate extending from the abutment portion toward the free end thereof, and has an elongated slot formed therein along its center line while the abutment portion is a substantially rectangular plate connected to the support portion at right angles. The support portion may also be a plate tapering toward the free end thereof.

In a preferred mode of the present invention, the center line of the support portion is arranged approximately at 60° relative to the abutment portion.

In carrying out the invention in one preferred mode, the fastening means comprises an internally threaded hole formed in the table and an externally threaded engaging member for engaging with the internally threaded hole through the elongated slot. Preferably, the externally threaded engaging member is a wing bolt or a thumb screw.

In yet another preferred mode of the present invention, the fastening means comprises: a first hole formed in the table, the first hole having a reduced bottom portion whose horizontal cross section is of any shape other than circular; a shaft for fitting in the first hole, the shaft having a rotation stopper formed on the upper surface thereof, a second, internally threaded hole formed therein, and a bottom protrusion so shaped as to fit in the reduced bottom portion of the first hole; and an externally threaded engaging member for engaging with the second hole formed in the shaft. When the shaft is fitted in the first hole, the bottom protrusion is also fitted in the reduced bottom portion so as to prevent the rotation of the shaft. Furthermore, the externally threaded engaging member is inserted through the elongated slot into, and engaged with, the second hole formed in the shaft to fasten the positioning apparatus on the table of the circular saw.

Preferably, the rotation stopper is formed in an approximate diamond shape whose opposite pairs of sides are so spaced that the rotation stopper slidably fits in the elongated slot. Also preferably, the externally threaded engaging member is a wing bolt or a thumb screw.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

With reference now to the drawings, and in particular to FIGS. 1 to 5 thereof, a new and improved positioning clamp 1 (1a) for use in a table-top circular saw will be described hereinafter.

Figure 1:
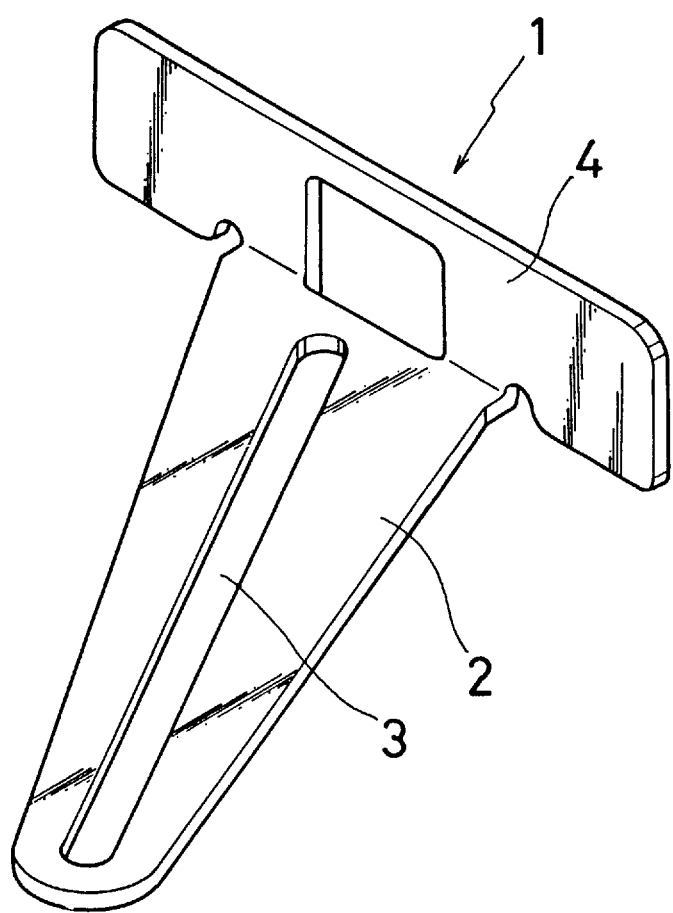
FIG. 1 is a perspective view of a positioning clamp for use in a table-top circular saw in accordance with the present invention.
Figure 2:
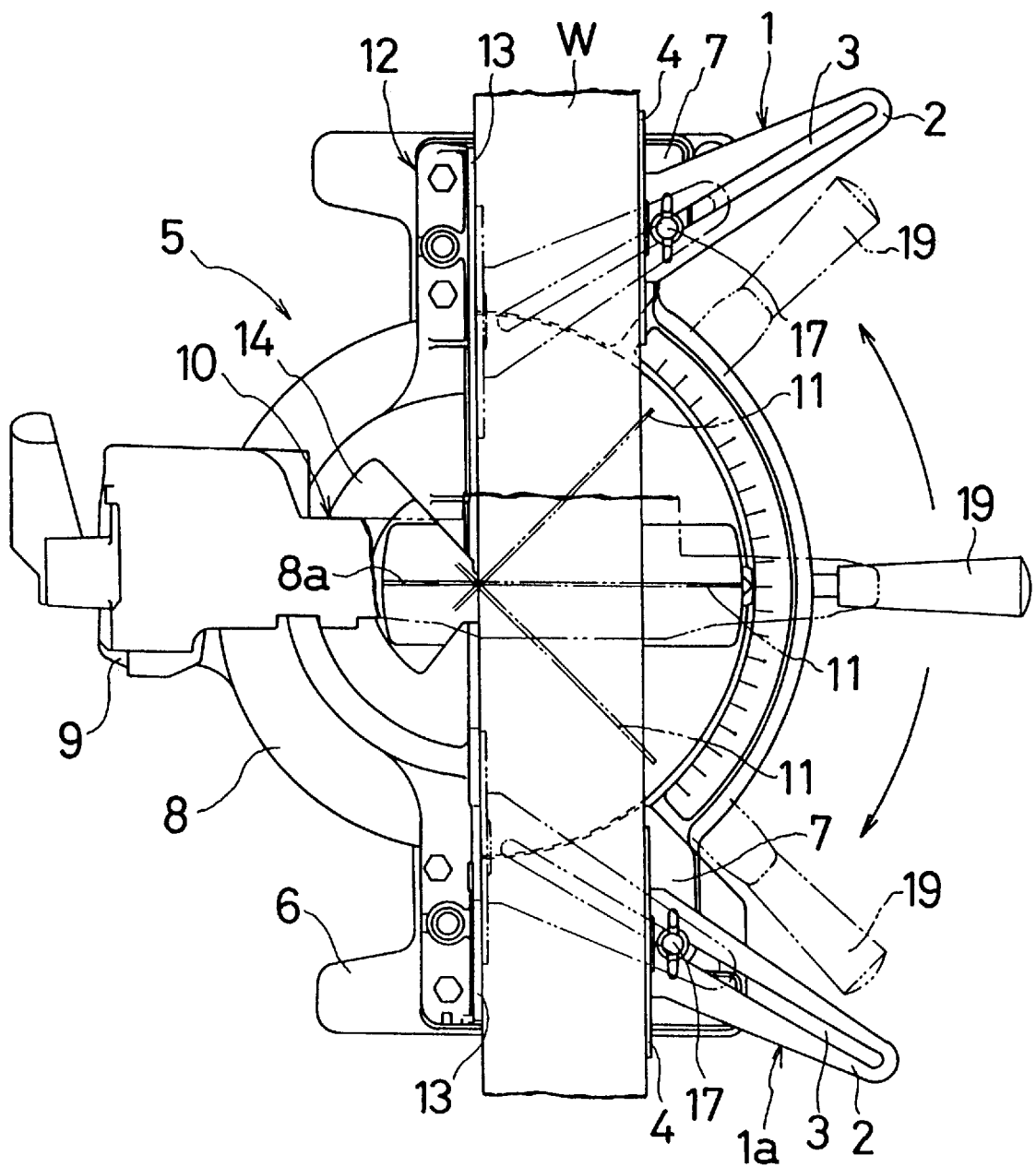
FIG. 2 is a plan view of a table-top circular saw employing a pair of the positioning clamps of FIG. 1.

FIG. 1 is a perspective view of the positioning clamp 1 for use in a table-top circular saw 5. FIG. 2 is a plan view of the table-top circular saw 5 employing a pair of positioning clamps 1 and 1a. The positioning clamp 1 essentially comprises a support plate 2 with an increasing width and a rectangular abutment plate 4 connected to the support plate 2 at right angles. Also, an elongated slot 3 is formed longitudinally along the approximate center line of the support plate 2. Furthermore, the support plate 2 is obliquely arranged so that the center line of the elongated slot 3 is at an angle of 60° to the abutment plate 4. The positioning clamp 1 is used on the right side of the table-top circular saw 5 seen from a handle 19 in FIG. 2. The left positioning clamp 1a is symmetrically constructed to the right positioning clamp 1; when it is installed as shown in FIG. 2, the center line of the elongated slot 3 is at an angle of 120° to the abutment plate 4.

Figure 6A:
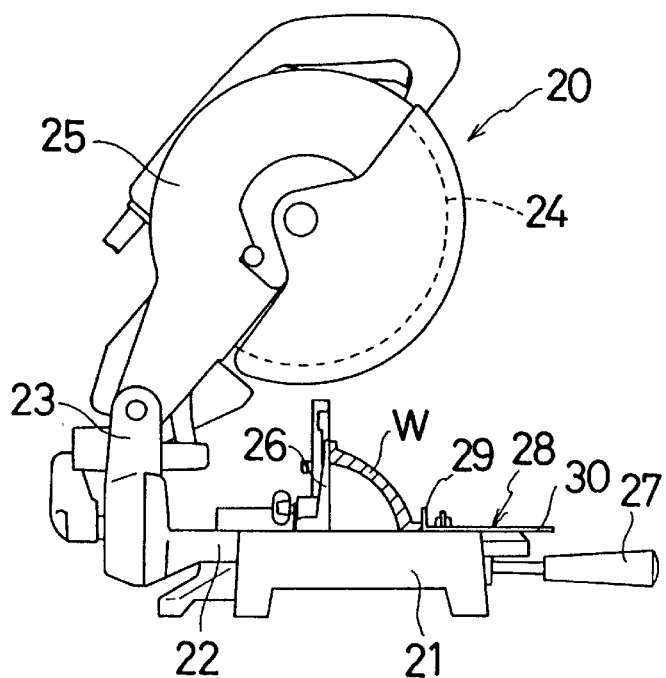
FIG. 6A is a side elevation of a prior art table-top circular saw with a pair of known positioning clamps.
Figure 6B:
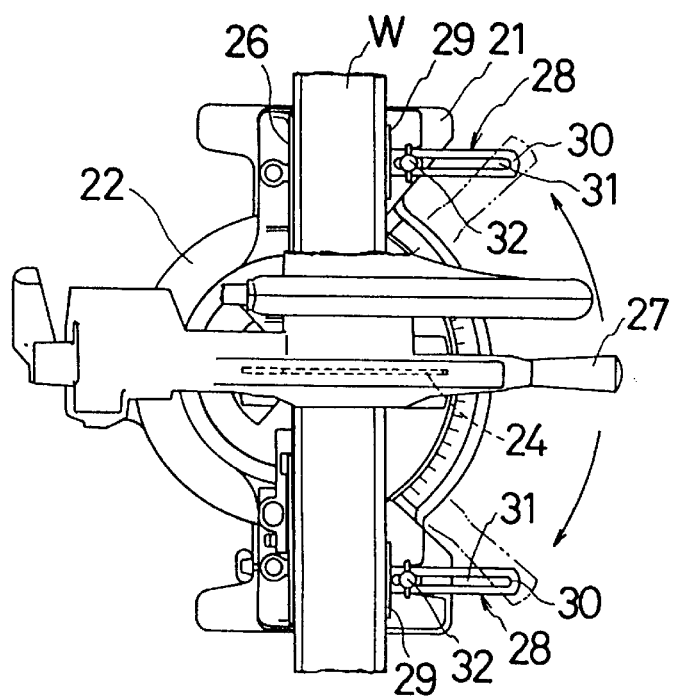
FIG. 6B is a plan view of the prior art table-top circular saw of FIG. 6A.
Figure 7A:
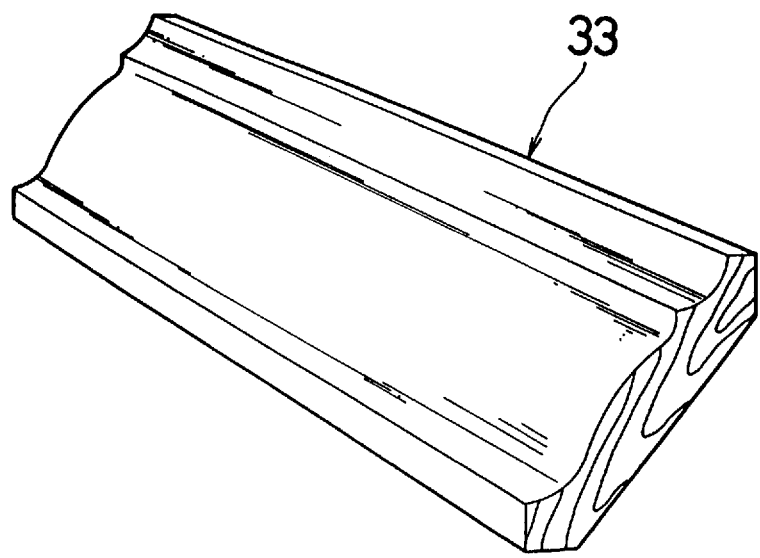
FIG. 7A is a perspective view of a typical molding piece.
Figure 7B:
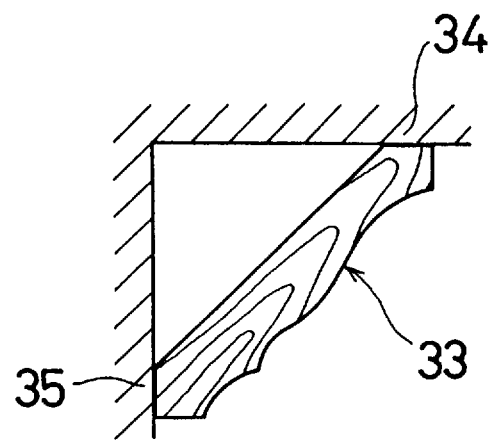
FIG. 7B is a cross sectional view of the typical molding piece of FIG. 7A installed as a facing member where a ceiling meets a wall.

The table-top circular saw 5 comprises a base structure 6 and a turntable 8 mounted on the base structure 6 and rotatable on a horizontal plane. Similar to the known circular saw 20 shown in FIGS. 6A and 6B, the table-top circular saw 5 is also provided with a laterally inclinable arm 9 attached to the rear (the left side as seen in FIG. 2) of the turntable 8. A saw assembly 10 with a saw blade 11 and a motor (not shown) for rotatably driving the blade 11 is pivotally attached to the top end of the arm 9. In addition to orthogonal cutting, the circular saw blade 5 can also perform angular cutting by tilting the saw assembly 10 and the arm 9 from the vertical position as well as diagonal cutting by turning the turntable 8 with a handle 19 in front of the table skirt thereof.

The turntable 8 has provided thereon a fence 12 which includes right and left guide portions 13 bolted to right and left wing portions 7 of the base structure 6. Also included in the fence 12 is a curved portion 14 horizontally circumventing a blade slot 8a in the turntable 8 for receiving the saw blade 11 therethrough. When in operation, a work piece W is abutted on the guide portions 13 for positioning.

Figure 3:
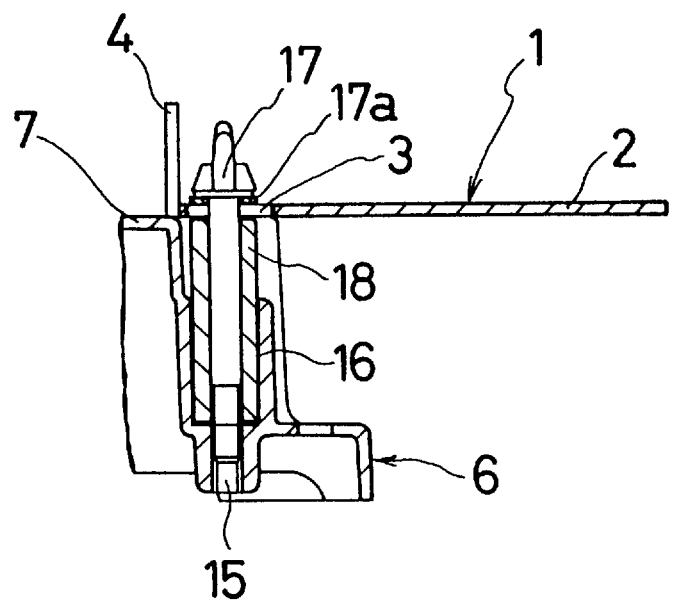
FIG. 3 is a partially sectional side view of the positioning clamp of the present invention fastened to the table-top circular saw of FIG. 2.

With reference to FIG. 3, a bottomed hole 16 provided with a threaded portion 15 at the bottom thereof is formed in the front portion of each wing portion 7. Also, an inner sleeve 18 is inserted into each bottomed hole 16. Each of the right and left positioning clamps 1 and 1a is fastened to the wing portion 7 by inserting a wing bolt 17 via a washer 17a into the inner sleeve 18 through the elongated slot 3 of the support plate 2 and tightening the wing bolt 17 in the threaded portion 15.

FIG. 2 shows the table-top circular saw 5 with the positioning clamps 1 and 1a symmetrically installed on the respective wing portions 7. To clamp a molding work piece W, the wing bolts 17 are first loosened. Next, while the work W is pressed against the fence 12, the abutment plates 4 are slid until they firmly abut on the work W. Subsequently, the wing bolts 17 are tightened to secure the positioning clamps 1 and 1a, so that the support plates 2 are extended at angles of 60° and 120°, respectively, to the work W.

As shown by two-dot chain lines, the closer the abutment plates 4 are located to the fence 12, the closer they clamp the work W to the blade slot 8a, which results in a more secure positioning of the work W. Furthermore, neither of the positioning clamps 1 and 1a interferes with the saw blade 11 in diagonal cutting as can be readily seen from the lateral pivotal range of the blade 11 indicated by two-dot chain lines of FIG. 2. Furthermore, since each of the elongated slots 3 is oriented at an angle to the fence 12, the support plates 2, once properly fastened by the wing bolt 17, do not shift along the elongated slots 3 even if the positioning clamps are subjected to a reaction force. Also, the part of each positioning clamp located to the right (as seen in FIG. 2) of the wing bolt 17 is extended obliquely and away from the blade slot 8a, thus leaving an unobstructed space in front of the circular saw 5 to improve the operability thereof. This construction prevents the positioning clamps 1 and 1a from interfering with the handle 19 in its entire moving range as indicated by two-dot chain lines.

Figure 4:
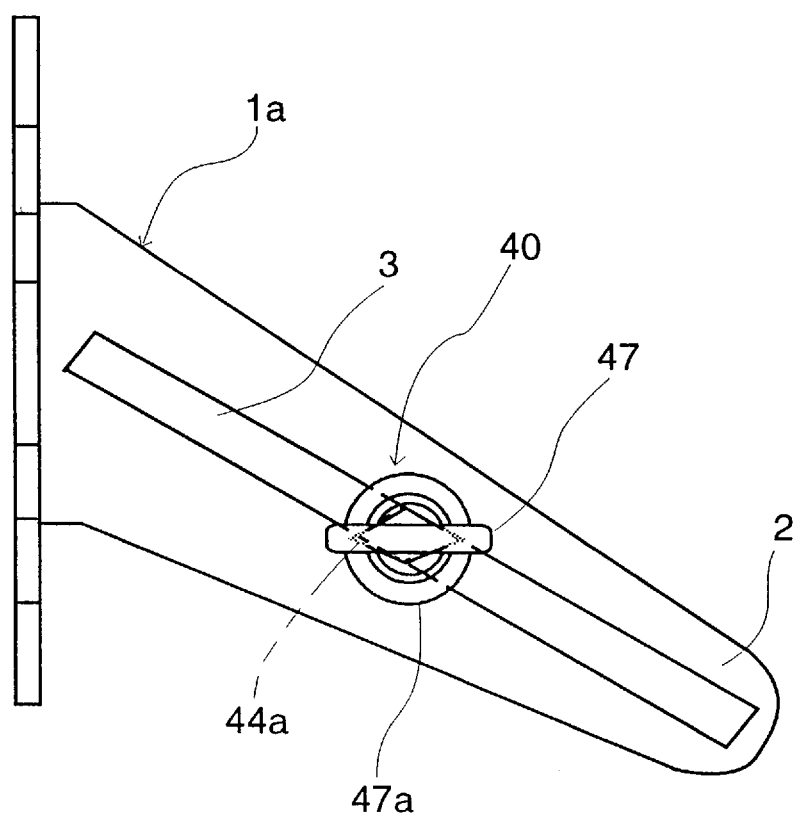
FIG. 4 is a plan view of a support plate fastening assembly for use with the positioning clamp of FIG. 1.
Figure 5:
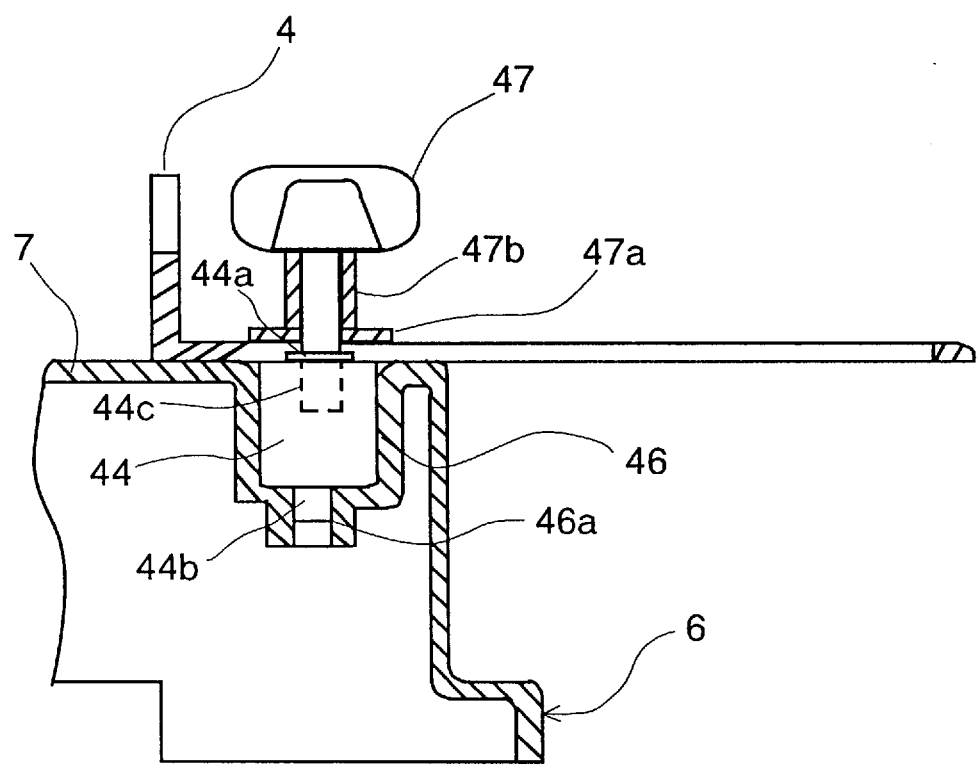
FIG. 5 is a partially sectional side elevation of the support plate fastening assembly installed in the table-top circular saw of FIG. 2.

Having described the invention based on the foregoing embodiment, various modifications and changes are possible within the scope of the invention. For example, FIG. 4 is a plan view of an alternative support plate fastening assembly 40 inserted through the elongated slot 3 of the positioning clamp 1a. FIG. 5 is a partially sectional side elevation of the support plate fastening assembly 40 installed in the wing portion 7 of the table-top circular saw 5. The fastening assembly 40 includes a thumb screw 47 having a sleeve 47b and a washer 47a fitted therearound. The fastening assembly 40 also includes a cylindrical shaft 44 with a rotation stopper 44a on the upper end thereof and a bottom protrusion 44b on the lower end thereof. An internally threaded hole 44c for engaging with the thumb screw 47 is formed in the top of the cylindrical shaft 44 through the center of the rotation stopper 44a. The rotation stopper 44a is a low, approximately diamond-shaped protrusion. The distance between each pair of opposite sides of the rotation stopper 44a is so determined that the stopper 44a fits snugly but still slidably in the elongated slot 3 of the positioning clamp 1a as indicated by broken lines in FIG. 5. It should be noted that having formed in a diamond shape, the stopper 44a also fits in the elongated slot 3 of the positioning clamp 1 in the same manner. The bottom protrusion 44b is a cylindrical portion with a pair of diametrical flat faces formed on its periphery.

As shown in FIG. 5, a through hole 46 is formed in the front portion of each wing portion 7 with the cylindrical shaft 44 fitted therein. Also, the through hole 46 has a reduced bottom portion 46a that has two inner flat faces into which the bottom protrusion 44b can fit. The positioning clamp can be fastened to the wing portion 7 by tightening the thumb screw 47 into the threaded hole 44c of the cylindrical shaft 44. Since the bottom protrusion 44b has two flat faces fitted into the matching bottom portion 46a of the through hole 46, the cylindrical shaft 44 does not rotate when subjected to external force. Moreover, since a pair of opposite sides of the rotation stopper 44a fit snugly but still slidably in the elongated slot 3 of either positioning clamp, the positioning clamp does not rotate relative to the cylindrical shaft 44, thus achieving a stable and accurate positioning of the work piece W.

As another example of a possible modification, the angle of the abutment plate 4 does not have to be 60° as in the foregoing embodiment; it may be changed to a suitable range. Also, the support plate 2 may be formed in some other shape, such as in a bar shape. Depending on the application, only one clamp may be installed on the circular saw. Alternatively, the circular saw may be fitted with a positioning clamp of the present invention on one side and a conventional, T-shaped clamp on the other.

As there may be many other modifications, alterations, and changes without departing from the scope or spirit of the essential characteristics of the present invention, it is to be understood that the foregoing embodiment is only an illustration and not restrictive in any sense. The scope or spirit of the present invention is limited only by the terms of the appended claims.

What is claimed is:

1. A positioning apparatus for use in a table-top circular saw which includes a fixed fence provided on a base of the circular saw and which includes a blade slot, the positioning apparatus comprising
   an abutment portion for abutting a workpiece placed on a table of the circular saw,
   a support portion extending from the abutment portion, the support portion having
      a workpiece end fixedly attached to the abutment portion;
      a free end distal to the workpiece end, and
      an elongated slot extending along a center line and between the workpiece end and the free end,
   the support portion extending obliquely relative to the workpiece in the direction away from a blade slot when the workpiece is positioned against the abutment portion, and
   a fastening means provided on the base for fastening the support portion on the table.

2. A positioning apparatus in accordance with claim 1, wherein
   the support portion is a plate extending from the abutment portion toward the free end thereof and defining a first plane, and
   the abutment portion includes a substantially rectangular plate connected to the support portion, the rectangular plate defining a second plane orthogonal to the first plane.

3. A positioning apparatus in accordance with claim 2, wherein the support portion is oriented to dispose the center line at an angle of approximately 60° relative to the the first plane.

4. A positioning apparatus in accordance with claim 1, wherein the fastening means comprises an internally threaded hole formed in the table and an externally threaded engaging member for engaging with the internally threaded hole through the elongated slot.

5. A positioning apparatus for positioning a workpiece against a fixed fence of a table-top circular saw having a base and a blade path, said apparatus comprising
   an abutment portion in contact with said workpiece and disposed to urge said workpiece against said fixed fence,
   a support portion having
      a workpiece end fixedly attached to said abutment portion,
      a free end, and
      an elongated slot extending between said workpiece end and said free end in a direction away from said blade path and forming an oblique angle relative to said workpiece, and
   fastening means for slideably fastening said support portion to said base thereby enabling said abutment portion to slide toward or away from said fixed fence to accommodate workpieces having different widths.

6. The apparatus of claim 5 wherein
   said support portion is a plate forming a first plane, and
   said abutment portion is a plate forming a second plane orthogonal to said first plane.

7. The apparatus of claim 6 wherein said elongated slot is disposed along a line forming an angle of approximately sixty degrees relative to said first plane.

8. The apparatus of claim 5 wherein said fastening means comprises an externally threaded shaft for passing through said elongated slot and engaging with an internally threaded hole in said base.

9. The apparatus of claim 8 wherein
   said shaft has bottom protrusion having a non-circular cross section, and
   said internally threaded hole includes a reduced bottom portion having a cross section complementary to the cross section of said bottom protrusion, thereby enabling said shaft to securely engage said reduced bottom portion.

10. The apparatus of claim 8 wherein said shaft comprises a rotation stopper formed on the upper surface thereof.

11. The apparatus of claim 10 wherein said rotation stopper is a diamond shaped stopper having two pairs of parallel sides, at least one pair of parallel sides being spaced to permit said rotation stopper to slide along said elongated slot.

12. A positioning apparatus for use in a table-top circular saw which includes a fixed fence provided on a base of the circular saw and which includes a blade slot, the positioning apparatus comprising
   an abutment portion for abutting a workpiece placed on a table of the circular saw,
   a support portion extending from the abutment portion, the support portion having
      a workpiece end fixedly attached to the abutment portion, a free end distal to the workpiece end, and
      an elongated slot extending along a center line and between the workpiece end and the free end,
   the support portion extending obliquely relative to the workpiece in the direction away from a blade slot when the workpiece is positioned against the abutment portion, and
   a fastening means provided on the base for fastening the support portion on the table, the fastening means including
      a shaft for fitting into a first hole formed in the table, the first hole having a reduced bottom portion with a non-circular cross section, the shaft having
         a rotation stopper formed on the upper surface thereof,
         a second, internally threaded hole formed therein, and
         a bottom protrusion so shaped as to fit into the reduced bottom portion of the first hole, the bottom protrusion being fitted into the reduced bottom portion of the first hole and
      an externally threaded engaging member inserted through the elongated slot and engaging with the second, internally threaded hole formed in the shaft.

13. A positioning apparatus in accordance with claim 12, wherein the rotation stopper is a diamond shaped rotation stopper having opposite pairs of sides spaced such that the rotation stopper slidably fits in the elongated slot.

* * * * *

UNITED STATES PATENT AND TRADEMARK OFFICE
CERTIFICATE OF CORRECTION

PATENT NO. : 5,819,623
DATED : October 13, 1998
INVENTOR(S) : Sasaki et al.

It is certified that error appears in the above-identified patent and that said Letters Patent is hereby corrected as shown below:

On the title page:
-- [73]  Assignee: Makita Corporation, Anjo, Japan.--

Signed and Sealed this

Twenty-sixth Day of October, 1999

Attest:

Q. TODD DICKINSON

*Attesting Officer*                *Acting Commissioner of Patents and Trademarks*